(12) United States Patent
Hennessey et al.

(10) Patent No.: US 9,094,367 B2
(45) Date of Patent: *Jul. 28, 2015

(54) METHOD AND APPARATUS FOR OPTIMIZING CONTENT DELIVERY ON LOCAL SUBNETS

(75) Inventors: Wade L Hennessey, Palo Alto, CA (US); John B. Wainwright, Los Gatos, CA (US)

(73) Assignee: KONTIKI, INC., Sunnyvale, CA (US)

( * ) Notice: Subject to any disclaimer, the term of this patent is extended or adjusted under 35 U.S.C. 154(b) by 1413 days.

This patent is subject to a terminal disclaimer.

(21) Appl. No.: 12/054,321

(22) Filed: Mar. 24, 2008

(65) Prior Publication Data

US 2008/0175182 A1    Jul. 24, 2008

Related U.S. Application Data

(63) Continuation of application No. 10/680,843, filed on Oct. 6, 2003, now Pat. No. 7,349,358.

(51) Int. Cl.
*H04H 20/71* (2008.01)
*H04L 29/06* (2006.01)

(52) U.S. Cl.
CPC .................... *H04L 63/0236* (2013.01)

(58) Field of Classification Search
CPC .. G06F 9/542; H04L 12/1845; H04L 65/4076
USPC .......................................................... 370/312
See application file for complete search history.

(56) References Cited

U.S. PATENT DOCUMENTS

| 5,928,331 | A  | * | 7/1999  | Bushmitch ............. 709/231 |
| 6,185,623 | B1 | * | 2/2001  | Bailey et al. ........... 709/238 |
| 6,611,872 | B1 |   | 8/2003  | McCanne |
| 6,751,221 | B1 | * | 6/2004  | Saito et al. ............. 370/392 |
| 7,966,414 | B2 | * | 6/2011  | Cinghita et al. ......... 709/231 |
| 2002/0143951 | A1 | * | 10/2002 | Khan et al. ............. 709/227 |
| 2003/0028623 | A1 |   | 2/2003  | Hennessey et al. |
| 2003/0028777 | A1 |   | 2/2003  | Hennessey et al. |
| 2003/0231629 | A1 | * | 12/2003 | Banerjee et al. ......... 370/390 |
| 2004/0068652 | A1 | * | 4/2004  | Carpentier et al. ...... 713/168 |
| 2004/0261071 | A1 | * | 12/2004 | Chuang et al. .......... 717/170 |
| 2005/0073967 | A1 |   | 4/2005  | Hennessey et al. |
| 2005/0259682 | A1 | * | 11/2005 | Yosef et al. ............. 370/468 |

OTHER PUBLICATIONS

Cranor, et al., "Enhanced Streaming Services in a Content Distribution Network," IEEE, pp. 65-75, 2001.
Wee, et al., "Research and Design of a Mobile Streaming Media Content Delivery Network," IEEE, pp. 1-3, Jul. 2003.
Delivery System Using Reliable Multicasting, IEEE, pp. 1216-1224, Nov. 1998.

* cited by examiner

*Primary Examiner* — Shaq Taha
(74) *Attorney, Agent, or Firm* — Park, Vaughan, Fleming & Dowler LLP

(57) ABSTRACT

One embodiment of the present invention provides a system that facilitates optimizing content delivery on a network. During operation, the system receives an item of content at a first client. During the download of the content or after downloading the content, the first client receives a broadcast request for the content from a second client on the same local subnet. Upon receiving the broadcast request, the first client sends a broadcast response to the local subnet, wherein the broadcast response identifies a multicast address to which the first client will deliver the content. The first client then delivers the content to the multicast address so that the second client and any other interested clients on the local subnet can receive the content.

9 Claims, 2 Drawing Sheets

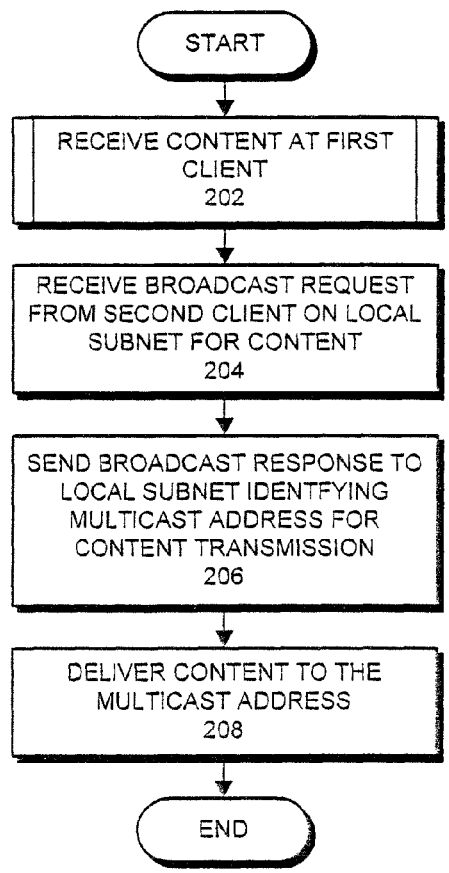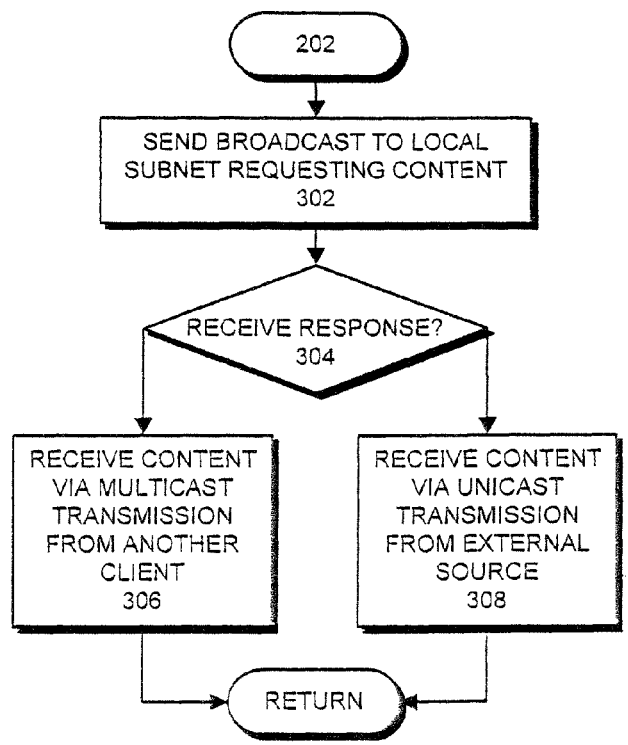
FIG. 2
FIG. 3

METHOD AND APPARATUS FOR OPTIMIZING CONTENT DELIVERY ON LOCAL SUBNETS

The present patent application is a Continuation of application Ser. No. 10/680,843, filed Oct. 6, 2003.

BACKGROUND

1. Field of the Invention

The present invention relates to systems that communicate across computer networks. More specifically, the present invention relates to a method and apparatus for optimizing content delivery on local subnets.

2. Related Art

In the recent past, the majority of local area networks were shared carrier networks. These shared carrier networks were typically unswitched, half-duplex networks. If one node on the network wanted to download a piece of content while all of the other nodes were inactive, the one node enjoyed virtually 100% of the available network bandwidth. However, if the one node was competing with another node on the local subnet for bandwidth, the bandwidth would theoretically be split between the two nodes, and the one node would see a transfer rate of about 50% of the previous transfer rate. The problem, however, is worse than this because each additional node on the network requires an increasing amount of network overhead to handle collision detection and collision avoidance.

With the emergence of low cost switches and increasing Ethernet speeds, these problems seem to have disappeared. On a switched network, traffic is routed to only the portions of the network where it is intended. Thus, two nodes on a switched network transferring files between themselves typically do not affect other clients on the same subnet.

Recent times, however, have brought new wireless networking technologies to the market place. While the majority of wireless networks provide a large number of benefits, they have at least one major drawback. Most wireless networks are shared carrier networks. This means that the bandwidth that each nodes consumes on the network decreases the bandwidth available to other nodes by at least that amount. While operating in "infrastructure mode," when a first node on a wireless network communicates with a second node, the first node typically transmits data to an access point which relays the data to the second node. Thus, when two nodes are communicating on a wireless network in this way, they are able to use less than half of the theoretical capacity of the network. Add a handful of additional nodes to the mix, and it is easy to see how quickly the network performance deteriorates.

Businesses, which have been some of the earliest adopters of wireless networks, often encounter a situation where many clients on the same subnet require the same content. For example, when a company releases a new presentation or a software update, that content is often distributed to virtually all of the nodes on the network. Moreover, businesses often employ a subscription-based delivery service in which every node that will eventually need a specific item of content has a subscription to a category that the content belongs. Each node checks at random intervals to see if there are new pieces of content for their subscription categories. After a new item of content becomes available, each node will eventually perform its content check and will subsequently download the new item of content. In this way, each node will independently download the same item of content, which consumes a large amount of wireless networking bandwidth. For example, if there are 10 nodes on a wireless subnet, trying to access the same 100 MB file, the 100 MB may have to be downloaded 10 separate times across the wireless network. From this example it is easy to see how quickly the wireless subnet can be overwhelmed with traffic.

Hence, what is needed is a method and an apparatus for distributing content to clients on a local subnet in a manner that minimizes the problems described above.

SUMMARY

One embodiment of the present invention provides a system that facilitates optimizing content delivery on a network. During operation, the system receives an item of content at a first client. During the download of the content or after downloading the content, the first client receives a broadcast request for the content from a second client on the same local subnet. Upon receiving the broadcast request, the first client sends a broadcast response to the local subnet, wherein the broadcast response identifies a multicast address to which the first client will deliver the content. The first client then delivers the content to the multicast address so that the second client and any other interested clients on the local subnet can receive the content.

In a variation on this embodiment, receiving the content at the first client involves first sending a broadcast to the local subnet requesting the content. If a response to the broadcast is received, the first client receives the content via a multicast transmission from another client on the local subnet. On the other hand, if a response to the broadcast is not received, the first client receives the content from a source outside of the local subnet via a unicast transmission.

In a further variation, if the first client receives the content via a unicast transmission, the first client additionally sends a second broadcast to the local subnet announcing that the first client is receiving the content, thereby allowing other clients on the local subnet to request to receive the content from the first client.

In a further variation, the second broadcast contains information about the content, including subscription information. This subscription information allows other clients to determine if they have a subscription to receive the content and should therefore request to receive the content.

In a further variation, the first client sends the second broadcast to the local subnet prior to receiving all of the content, whereby the first client can start transferring the content to other clients on the local subnet via multicast prior to receiving all of the content.

In a variation on this embodiment, the first client receives a broadcast message from another client on the local subnet announcing that the other client is transmitting another item of content, and including a second multicast address for delivery of the other content. The first client then determines if it needs the other content, and if so, receives the other content via the second multicast address.

In a variation on this embodiment, the local subnet is a shared-carrier network.

In another variation, the local subnet is a wireless network.

In another variation, the wireless network adheres to the 802.11x protocols.

In a variation on this embodiment, the second client starts receiving the multicast of the content while the multicast is already in progress.

BRIEF DESCRIPTION OF THE FIGURES

FIG. 2 presents a flowchart illustrating the process of optimizing content distribution on a local subnet in accordance with an embodiment of the present invention.

FIG. 3 presents a flowchart illustrating the process of acquiring content in accordance with an embodiment of the present invention.

DETAILED DESCRIPTION

Figure 1:
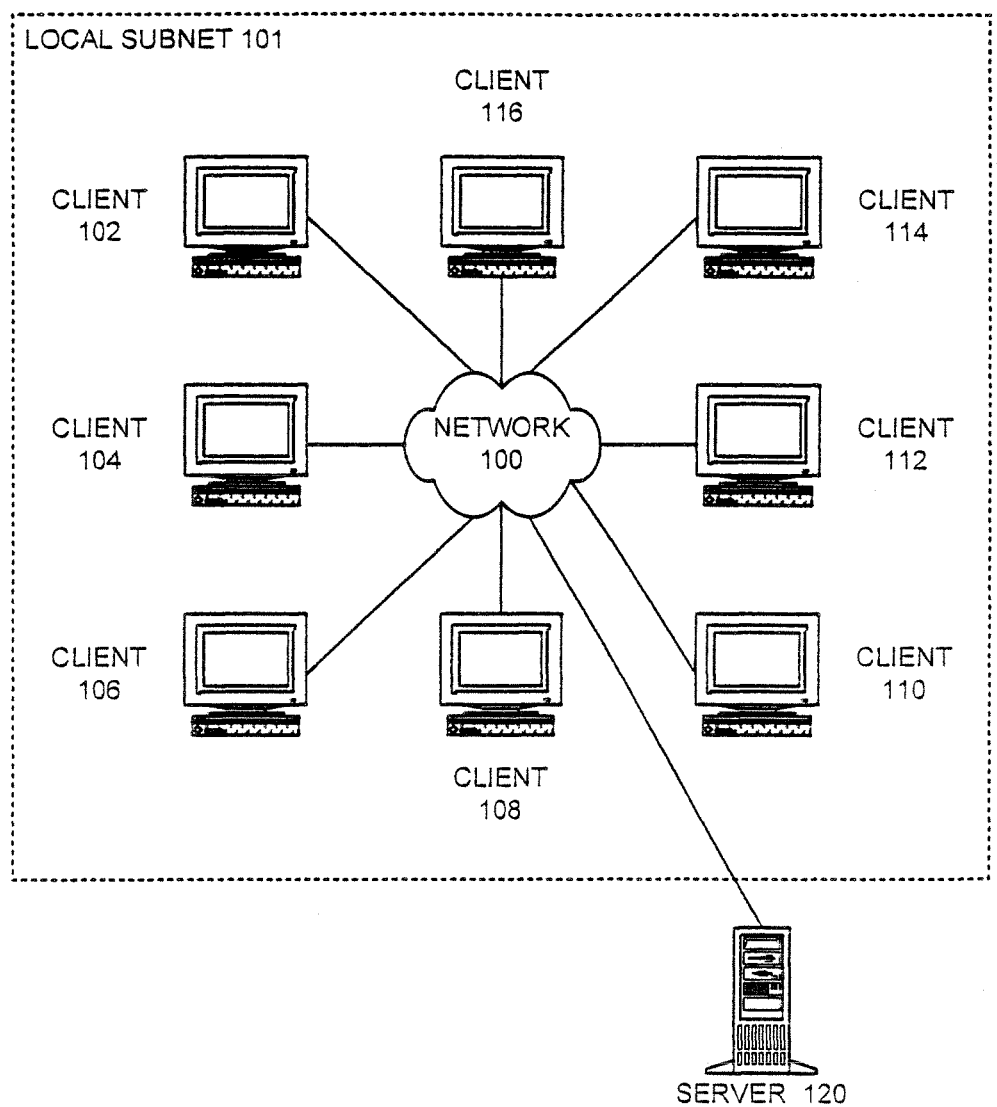
FIG. 1 illustrates a local area computer network in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Local Area Network

FIG. 1 illustrates a local area computer network 100 in accordance with an embodiment of the present invention. Network 100 can generally include any type of wire or wireless communication channel capable of coupling together computing nodes. Coupled to network 100 are clients 102-116 and server 120. Clients 102-116 can generally include any node on network 100 including computational capability and including a mechanism for communicating across network 100. Server 120 can generally include any computational node including a mechanism for servicing requests from a client for computational and/or data storage resources.

In one embodiment of the present invention, network 100 is a shared carrier wired network that operates in unswitched, half-duplex mode. In another embodiment of the present invention, network 100 is a wireless network that adheres to one of the 802.11x protocols. In either of these embodiments, when client 102 communicates with client 104, packets communicated between clients 102 and 104 tie up the shared carrier or wireless frequency, reducing the bandwidth available to the other clients on network 100. For the purposes of the present invention, clients 102-116 are all located on local subnet 101, while server 120 is not on local subnet 101.

Process of Optimizing Content Distribution on a Local Subnet

FIG. 2 presents a flowchart illustrating the process of optimizing content distribution on local subnet 101 in accordance with an embodiment of the present invention. The system starts when an item of content is received at client 102 (step 202). Next, client 102 receives a broadcast request for the content from client 104 on network 100 (step 204). Note that client 102 may receive the broadcast from client 104 while client 102 is still receiving the content, as well as after client 102 has received the content. In response to this request, if client 102 still has the content, client 102 sends a broadcast to local subnet 101 on network 100 identifying the content and any associated subscription and specifying a multicast address to which client 102 will send the content (step 206). Client 102 then delivers the content to the multicast address (step 208).

By sending the broadcast to local subnet 101 that identifies the content and the multicast address, client 102 allows other clients on local subnet 101 on network 100 to determine if they need the content, and if so, to receive the content without consuming any additional bandwidth on network 100. In a subscription-based environment, every client that has a subscription to the source of the content, but does not yet have this particular item of content, can respond to the broadcast and can retrieve the content via client 102's multicast of the content.

By utilizing this system in a subscription-based environment (where clients check for new items in their subscriptions at a random interval over a certain period of time) it is possible to deliver the content to an arbitrary number of clients on local subnet 101 with the actual bits being transmitted only twice. The first transfer loads the content from the source to the original client, for example client 102, and the second transfer multicasts the content from client 102 to all of the other interested clients on local subnet 101. Note that client 102 could alternatively broadcast the content to the whole subnet, but this broadcast would cause other clients on local subnet 101 to have to examine each broadcast packet even if the other clients are not interested in them, thus causing additional work for the processor on each client. Note that although broadcast is not as efficient as multicast, it is still an improvement over multiple unicast downloads by each client. By using multicast, clients that do not want the content do not configure themselves to receive the content on the multicast address, and are thereby able to filter out the packets at the network interface level, without having to interrupt the processor.

Initially Acquiring the Content

FIG. 3 presents a flowchart illustrating the process of acquiring an item of content in accordance with an embodiment of the present invention. When client 102 on network 100 initially wants an item of content, client 102 first sends out a broadcast on local subnet 101 to see if any other client on local subnet 101 already has the content (step 302). Next, client 102 determines if there is a response to the request (step 304). If so, client 102 receives the content via a multicast transmission from the other client (step 306). If not, client 102 receives the content via a unicast transmission from the content's original source, such as server 120, from outside local subnet 101 (step 308).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing content delivery on a network, comprising:

a first client, which is on a local subnet, receiving content via a unicast transmission from a source outside of the local subnet;

the first client sending a first broadcast to the local subnet announcing that the first client is receiving the content, thereby allowing other clients on the local subnet to request to receive the content from the first client, wherein the first client sends the first broadcast to the local subnet prior to receiving all of the content;

the first client receiving, on the local subnet, one or more responses to the first broadcast requesting the content;

the first client identifying, on the local subnet, a destination multicast address to deliver the content on the local subnet;

the first client sending, on the local subnet, a second broadcast that identifies the destination multicast address; and the first client delivering, on the local subnet, the content to the destination multicast address, wherein the first client begins delivering received content to the destination multicast address prior to receiving all of the content.

2. The method of claim 1, wherein the first broadcast contains information about the content, including subscription information, whereby other clients can determine if they have a subscription to receive the content and should therefore request to receive the content.

3. The method of claim 1, further comprising:

the first client receiving a broadcast message from a second client on the local subnet announcing that the second client is transmitting another item of content, and including a second multicast address for delivery of the other item of content;

the first client determining if the first client needs the other content; and if so, the first client receiving the other content via the second multicast address.

4. A non-transitory computer-readable storage medium storing instructions that when executed by a processor at a first client cause the first client to perform a method for optimizing content delivery on a network, the method comprising:

receiving content at the first client via a unicast transmission from a source outside of a local subnet;

sending a first broadcast to the local subnet announcing that the first client is receiving the content, thereby allowing other clients on the local subnet to request to receive the content from the first client, wherein the first client sends the first broadcast to the local subnet prior to receiving all of the content;

receiving, on the local subnet, one or more responses to the first broadcast requesting the content;

identifying, on the local subnet, a destination multicast address to deliver the content on the local subnet;

sending, on the local subnet, a second broadcast that identifies the multicast address for receiving the content; and delivering, on the local subnet, the content to the multicast address, wherein the first client begins delivering received content to the destination multicast address prior to receiving all of the content.

5. The non-transitory computer-readable storage medium of claim 4, wherein the first broadcast contains information about the content, including subscription information, whereby other clients can determine if they have a subscription to receive the content and should therefore request to receive the content.

6. The non-transitory computer-readable storage medium of claim 4, wherein the method further comprises:

receiving a broadcast message at the first client from a second client on the local subnet announcing that the second client is transmitting another item of content, and including a second multicast address for delivery of the other content;

determining if the first client needs the other item of content; and if so, receiving the other content at the first client via the second multicast address.

7. An apparatus at a first client for optimizing content delivery on a network, the apparatus comprising:

a content receiving mechanism configured to receive content at the first client via a unicast transmission from a source outside of a local subnet;

a broadcast sending mechanism configured to send a first broadcast to the local subnet announcing that the first client is receiving the content, thereby allowing other clients on the local subnet to request to receive the content from the first client, wherein the first client sends the first broadcast to the local subnet prior to receiving all of the content;

a request receiving mechanism to receive, on the local subnet, a response to the first broadcast requesting the content;

an identification mechanism to identify, on the local subnet, a destination multicast address to deliver the content on the local subnet;

a response mechanism to send, on the local subnet, a second broadcast that identifies the multicast address; and a delivery mechanism to deliver the content to the multicast address, wherein the delivery mechanism begins delivering received content to the destination multicast address prior to the content receiving mechanism receiving all of the content.

8. The apparatus of claim 7, wherein the first broadcast contains information about the content, including subscription information, whereby other clients can determine if they have a subscription to receive the content and should therefore request to receive the content.

9. The apparatus of claim 7, further comprising:

a broadcast receiving mechanism configured to receive a broadcast message at the first client from a second client on the local subnet announcing that the second client is transmitting another item of content, and including a second multicast address for delivery of the other item of content;

a determination mechanism configured to determine if the first client needs the other content; and a second content receiving mechanism configured to receive the other content at the first client via the second multicast address if the first client needs the other content.

* * * * *